United States Patent
Rönnebro et al.

(10) Patent No.: US 7,608,233 B1
(45) Date of Patent: Oct. 27, 2009

(54) DIRECT SYNTHESIS OF CALCIUM BOROHYDRIDE

(75) Inventors: Ewa Carin Ellinor Rönnebro, Dublin, CA (US); Eric H. Majzoub, Pleasanton, CA (US)

(73) Assignee: Sandia Corporation, Livermore, CA (US)

( * ) Notice: Subject to any disclaimer, the term of this patent is extended or adjusted under 35 U.S.C. 154(b) by 165 days.

(21) Appl. No.: 11/807,012

(22) Filed: May 24, 2007

Related U.S. Application Data

(60) Provisional application No. 60/901,248, filed on Feb. 12, 2007.

(51) Int. Cl.
*C01B 6/13* (2006.01)
*C01B 6/24* (2006.01)
*C01B 6/00* (2006.01)
*C01B 6/04* (2006.01)
*C01B 3/02* (2006.01)
*C01B 3/08* (2006.01)

(52) U.S. Cl. ............. 423/286; 423/644; 423/645; 423/646; 423/648.1; 423/658.2

(58) Field of Classification Search ............ None
See application file for complete search history.

(56) References Cited

U.S. PATENT DOCUMENTS

| | | | | |
|---|---|---|---|---|
| 2,545,633 | A | 3/1951 | Schlesinger | 23/14 |
| 2,575,760 | A | 11/1951 | Hockstra | 23/17 |
| 3,224,832 | A | 12/1965 | Pearson | 23/14 |
| 3,993,732 | A | 11/1976 | Filby | 423/286 |
| 4,193,978 | A | 3/1980 | Muller | 423/648 |
| 6,251,349 | B1 * | 6/2001 | Zaluska et al. | 423/286 |
| 6,524,542 | B2 | 2/2003 | Amendola | 423/286 |
| 2005/0226801 | A1 * | 10/2005 | Chin | 423/286 |

FOREIGN PATENT DOCUMENTS

WO  WO 2005091765 A2 * 10/2005

OTHER PUBLICATIONS

Klebanoff et al. (Metal Hydride Center of Excellence Presentation; Jan. 2, 2006).*
Titov, L. V.; Eremin, E. R.; "Complex of Aluminum Borohydride with Calcium Borohydride". Bulletin of the Academy of Sciences of the USSR. Division of Chemical Science, vol. 24, No. 5, 1975. pp. 1095-1096.
Titov, L. V.; Gavrilova, L. A.; "Borohydrides of the Alkali and Alkaline-Earth Metals", Bulletin of the Academy of Sciences of the USSR. Division of Chemical Science, vol. 25, No. 2, 1976. pp. 232-235.

(Continued)

*Primary Examiner*—Melvin C Mayes
*Assistant Examiner*—Guinever S Gregorio
(74) *Attorney, Agent, or Firm*—Timothy P. Evans

(57) ABSTRACT

A method is disclosed for directly preparing an alkaline earth metal borohydride, i.e. $Ca(BH_4)_2$, from the alkaline earth metal hydride and the alkaline earth metal boride. The borohydride thus prepared is doped with a small portion of a metal chloride catalyst compound, such as $RuCl_3$, $TiCl_3$, or a mixture of $TiCl_3$ and palladium metal. The process provides for mechanically mixing the dry reagents under an inert atmosphere followed by charging the mixed materials with high pressure hydrogen at about 70 MPa while heating the mixture to about 400° C. The method is relatively simple and inexpensive and provides reversible hydride compounds which are free of the usual contamination introduced by prior art wet chemical methods.

12 Claims, 3 Drawing Sheets

OTHER PUBLICATIONS

Gomes, S.; Hagemann, H.; Yvon, K.; "Lithium boro-hydride LiBH4 II. Raman spectroscopy". Journal of Alloys and Compounds 346. 2002, pp. 206-210.

Barkhordarian, G.; Klassen, T.; Dornheim, M.; Bormann, R.; "Unexpected kinetic effect of MgB2 in reactive hydride composites containing complex borohydrides", Journal of Alloys and Compounds xxx. 2006, pp. 1-4.

Titov, L. V.; "Synthesis of Calcium Borohydride", *IZD-VO Akademii Nauk SSSR,* 1964, 154(3), pp. 654-656.

Miwa, K.; Aoki, M.; Noritake, T.; Ohba, N.; Namamorei, Y.; Towata, S.; Zuttel, A.; and Orimo, S.; "Thermodynamical stability of calcium borohydride $Ca(BH_4)_2$", *Physical Review B,* 2006, 74, pp. 1-5.

\* cited by examiner

DIRECT SYNTHESIS OF CALCIUM BOROHYDRIDE

CROSS REFERENCE TO RELATED APPLICATIONS

This application claims priority to prior provisional U.S. Patent Application Ser. No. 60/901,248 originally filed Feb. 12, 2007 entitled "SOLID-STATE SYNTHESIS OF CALCIUM BOROHYDRIDE AND ITS USE FOR REVERSIBLE HYDROGEN STORAGE" from which benefit is claimed.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

TECHNICAL FIELD

This invention relates to a method direct synthesis of metal borohydride compounds. More particularly, this present invention relates to a method for directly producing a calcium borohydride.

BACKGROUND

As the cost of energy continues to soar, increasing interest is directed toward the development of new sources of fuels. The continuing and ever increasing consumption of fossil resources is of particular concern due both to the consequences of increased global demand for dwindling reserves of easily obtained petroleum oil and the continuing and growing threat of global warming. In particular, the amount of petroleum oil refined and burned as gasoline in order to fuel automobiles in this country and the amount of natural gas, coal and petroleum fuel for central electric power-generating stations continues to increase with no end in sight. An alternative fuel for either or both of these applications is especially desired in view of the amounts of resources consumed and the amount of greenhouse gases generated annually as a result of converting these fuels into energy through combustion.

One possible and very attractive alternative fuel is hydrogen since it produces only water vapor as a byproduct when burned. However, storage of hydrogen for automotive applications is problematic. Storage of hydrogen as a metal hydride has been extensively investigated for at least the last 40 years. Unfortunately, because of thermodynamic and kinetic constraints, the essential properties needed for a hydride storage material (high hydrogen capacity, low reaction enthalpy, reversibility and low desorption temperature) are very difficult to satisfy simultaneously.

Simple binary hydride compounds, such magnesium hydride ($MgH_2$), have been shown promise in that it exhibits good hydrogen reversibility, fast reaction kinetics, and a relatively high hydrogen capacity (7.6 wt %). Unfortunately, $MgH_2$ reaches a hydrogen equilibrium pressure of 1 bar at a temperature of 300° C.: a temperature well above what is believed to be an operating temperature upper limit of about 120° C. for automobile applications.

In order to overcome this shortcoming, several complex metal hydride compounds have been investigated including materials known as alanates. Moreover, borohydride compounds, particularly calcium borohydride, are being investigated for their utility to reversibly store and release hydrogen on demand. Unfortunately, reasonably pure calcium borohydride is not easily prepared. Several of the accepted prior art methods include using diborane ($B_2H_6$) gas (see U.S. Pat. Nos. 2,545,633 and 3,224,832), a potentially dangerous material due to its ability to spontaneously ignite in moist air, and as a causative agent for respiratory distress. Current methods appear to utilize sodium borohydride and calcium chloride as precursor materials (L. V. Titov; "Synthesis of calcium borohydride," *Zhurnal Neorganicheskoi Khimii*, 1969, v. 13(7): pp. 1797-1800)

SUMMARY

In an embodiment of the present invention, there is provided a method for preparing an alkaline earth metal borohydride in a three-step process for direct synthesis of an alkaline earth metal borohydride.

In accordance with one aspect of the invention there is provided a method of producing an alkaline earth borohydride comprising mechanically milling and compacting powders of a metal boride powder with an alkaline earth metal hydride followed by high pressure hydrogenation.

In another aspect of this invention, there is provided a method for preparing an alkaline earth metal borohydride, wherein the first step comprises mechanical milling powders of the precursor materials, the second comprises mechanically compacting the milled powders, and the third step comprises high pressure hydrogenation of the compacted powders at an elevated temperature.

In a further aspect of this invention, the first step of the method is performed with dry powders, i.e. without a solvent or any other suspension aid, in a dry inert atmosphere such as argon. The method is further accomplished by subjecting the reagent materials to a milling means that consists of a ball mill, a plate or impact grinder, a blade, rod or whisk mixer, blender, or agitator.

In still another aspect of the invention, the second step comprises compacting the milled powders into a pressed pellet.

In yet another aspect of the invention, the third step comprises exposing pressed pellets to high pressure hydrogen gas at a temperature above about 400° C.

In another aspect of this invention, there is provided a method of producing an alkaline earth metal borohydride comprising mechanically milling powders of a metal boride powder with an alkaline earth metal hydride and a metal chloride catalyst compound.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

Figure 1:
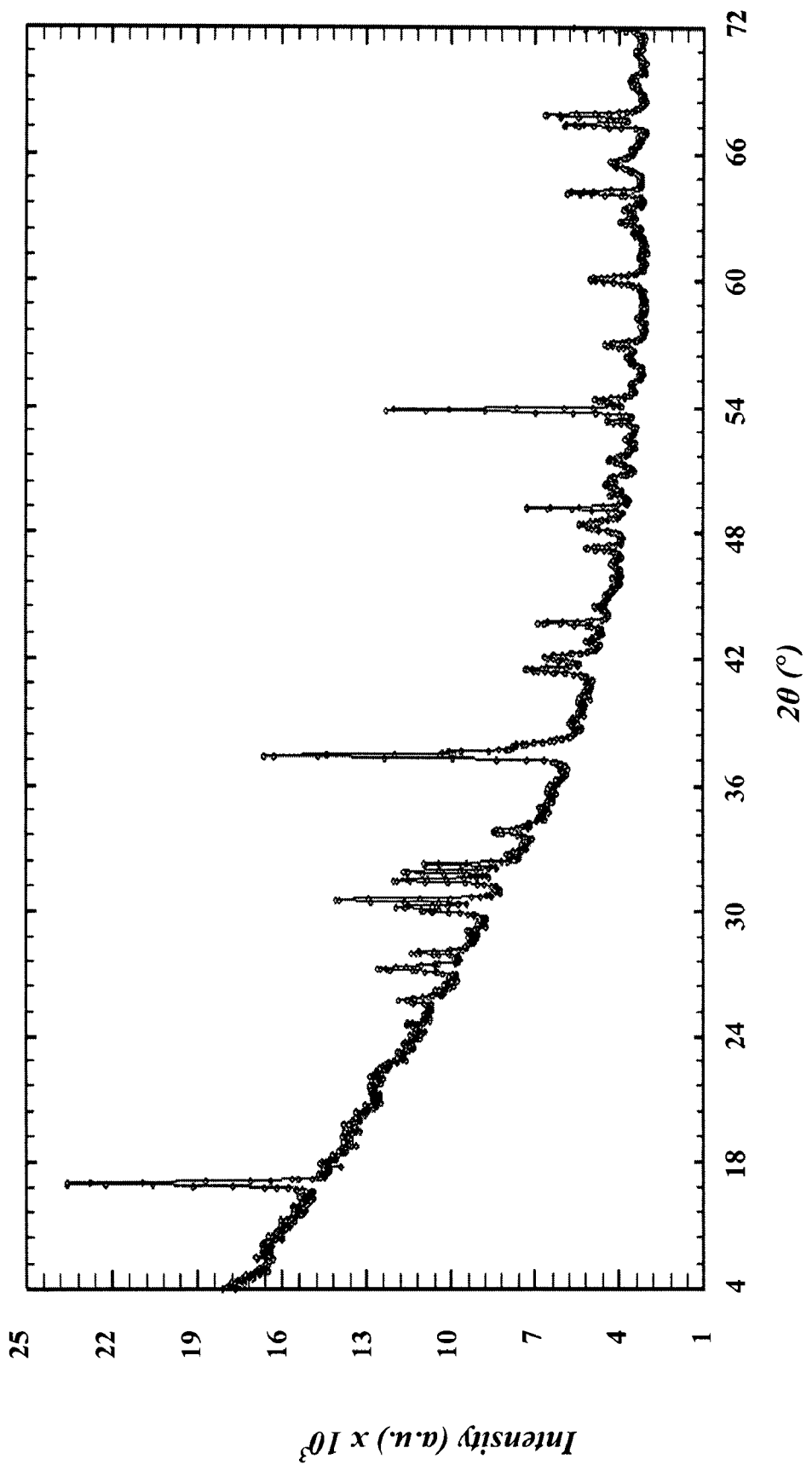
FIG. 1 shows a powder X-ray diffraction pattern of a sample made by reacting $CaB_6+2CaH_2+4$ wt % $TiCl_3+4$ wt % Pd at 70 MPa and 440° C. The sample was found to contain $Ca(BH_4)_2+CaB_6+CaH_2+CaO$.

curve (red) showing two endothermic phase transformations at 140° C. and at 350° C., and a concomitant release of hydrogen at 350° C.

DETAILED DESCRIPTION OF THE EMBODIMENTS OF THE INVENTION

In a particular embodiment of the invention, the synthesis of alkaline earth borohydrides comprises mixing powders of a simple alkaline earth metal hydride (e.g. $CaH_2$) with the equivalent alkaline earth boride (e.g. $CaB_6$) in a roughly 1:2 molar ratio of the hydride to the boride. A small amount of metal chloride compound (typically $TiCl_3$, $RuCl_3$, or a mixture of palladium metal and $TiCl_3$) is added to this mixture which is then ball milled under an inert atmosphere. (While not attempted, other inert, dry gases such as helium are also believed to be effective). Milling is carried out at or near room temperature.

After milling, the mixed powders are compacted in the hydraulic press and formed into one or more pellets which are then placed in a commercial stainless steel autoclave, and the vessel purged and filled with hydrogen and heated in order to initiate a reaction to provide the borohydride.

By way of example, the powders of the present invention were milled in a high energy ball mill such as are available from SPEX CertiPrep Inc., (203 Norcross Avenue, Metuchen, N.J. 08840). A SPEX 8000 series mixer/miller using tungsten carbide balls and operated at a weight ratio of powders-to-mill balls of about 1:9 was found to be suitable. A single batch of mixed powders comprised about 3 grams of material per run.

The powders were milled, at near room temperature, under high purity argon gas atmosphere. After milling, the powder was transferred into an argon filled glove box and then into a mold assembly and the powders pressed into pellets. The pressed pellets were then transferred to a stainless steel commercial autoclave-type vessel and exposed to high purity (99.999%) hydrogen gas pressurized to several hundred atmospheres while the autoclave vessel and its contents are heated externally with electrical tape. Pressure measurements were taken using a calibrated pressure transducer for the absorption half-cycle and/or a calibrated capacitance manometer for the desorption half-cycle. Data was recorded with a computer.

EXAMPLE

Calcium borohydride was produced by combining 1.58 grams of $CaB_6$ with 1.26 grams of $CaH_2$ powder (molar ratio of 1.0:2.0) and about 0.16 grams (or ca. 4w/0) of $RuCl_3$ catalyst. This mixture was mechanically milled in a tungsten-carbide lined steel vial with several tungsten-carbide balls in a SPEX mill (SPEX 8000) packed at a powder-to-ball weight ratio of about 1:9. The process was carried out at room temperature and under an argon atmosphere. The mixture of powders was milled for about 30 minutes.

The mixture is milled under a dry argon atmosphere. After milling, the milled powder was transferred into a stainless steel punch and die assembly and formed into pellets. Powder compacting was done using a CARVER LABORATORY PRESS®, or any similar bench-type hydraulic press, having a gauge clamping-force of about 1 ton. The pellets were then placed into an AE Closure Pressure Vessel manufactured by the Autoclave Engineers Fluid Component Division of Snap-Tite, Inc. (Erie, Pa.) having an internal volume of about 100 cm³. Once sealed in the vessel the pellets were exposed to high purity (99.999%) hydrogen gas and pressurized to between about 80 atm and about 100 atm after which the vessel and its contents were heated externally to about 400° C.-440° C. to initiate the reaction:

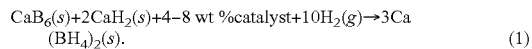

$$CaB_6(s)+2CaH_2(s)+4-8 \text{ wt \%catalyst}+10H_2(g) \rightarrow 3Ca(BH_4)_2(s). \quad (1)$$

The pellets were heated to 400° C. in a hydrogen atmosphere of 70 MPa (700 bar) $H_2$ pressure in a commercial autoclave and the pellet changes color from brown to grey during the reaction. Heating continued for up to 48 hours. Pressure measurements were taken by using a calibrated pressure transducer for the absorption half-cycle and a calibrated BARATRON®-type capacitance manometer for the desorption half-cycle. Data was recorded with a computer.

FIG. 1 shows a powder X-ray diffraction (XRD) pattern of a sample made by reacting $CaB_6+2CaH_2+4$ wt % $TiCl_3+4$ wt % Pd at 70 MPa and 440° C. The sample was found to contain $Ca(BH_4)_2+CaB_6+CaH_2+CaO$ and diffraction pattern was found to agree well with an XRD pattern of calcium borohydride pattern published recently by Miwa, et al. (*Physical Review*, B, v. 74, 2006: pp. 155122-1-155122-5). XRD analysis also indicated that the highest process yield (ca 75-80%) was obtained by using a $RuCl_3$ catalyst. Samples using a mixture of $Pd+TiCl_3$ as the catalyst resulted in a lower yield then those using $RuCl_3$ but higher than the yield obtained when using only $TiCl_3$ as the catalyst.

Figure 2:
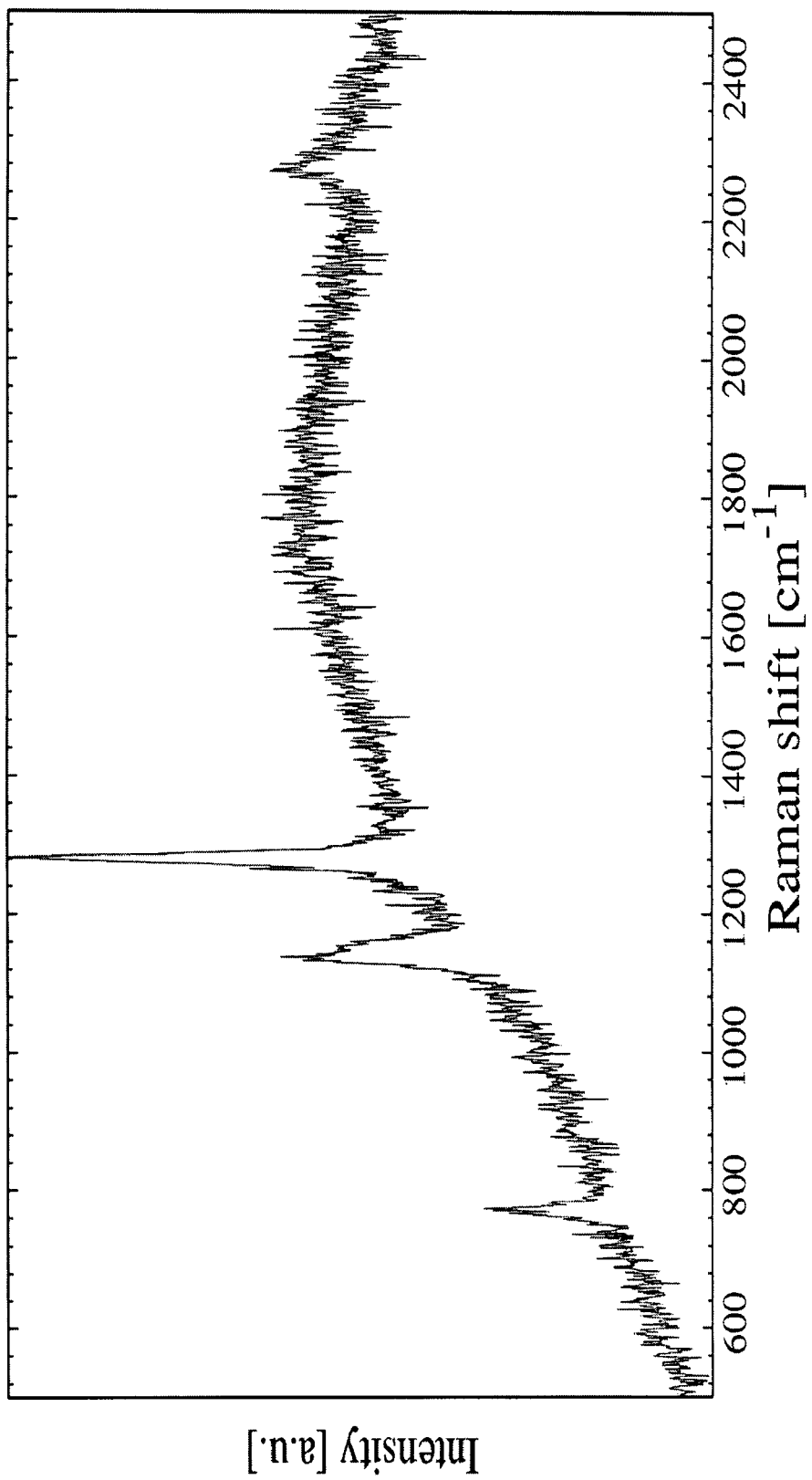
FIG. 2 shows a Raman spectra of a synthesized sample of $Ca(BH_4)_2$ showing the shifts from the $[BH_4^-]$ anion at 2300 $cm^{-1}$.

A Raman spectrum of the synthesized powders is shown in FIG. 2. The Raman peak we observe at 2300 $cm^{-1}$ is in agreement with values of the $[BH_4^-]$ symmetric stretching mode in Na, K, Rb, and Cs borohydrides, as shown by G. Renaudin, et al. ("Structural and spectroscopic studies on the alkali borohydrides $MBH_4$ (M=Na, K, Rb, Cs)", *Journal of Alloys and Compounds*., v. 375, 2004: pp. 98-106). In these materials, the $BH_4$ symmetric stretch vibrations were found to appear between 2250 $cm^{-1}$ and 2400 $cm^{-1}$. The observed Raman peak at 2300 $cm^{-1}$ for the compound of the present embodiment is also in accordance with the values calculated by K. Miwa, et al., ("Thermodynamical stability of calcium borohydride $Ca(BH_4)_2$", *Physical Review B*, v. 74 (2006): pp. 155122-1-155122-5) for the $Ca(BH_4)_2$ structure.

Figure 3:
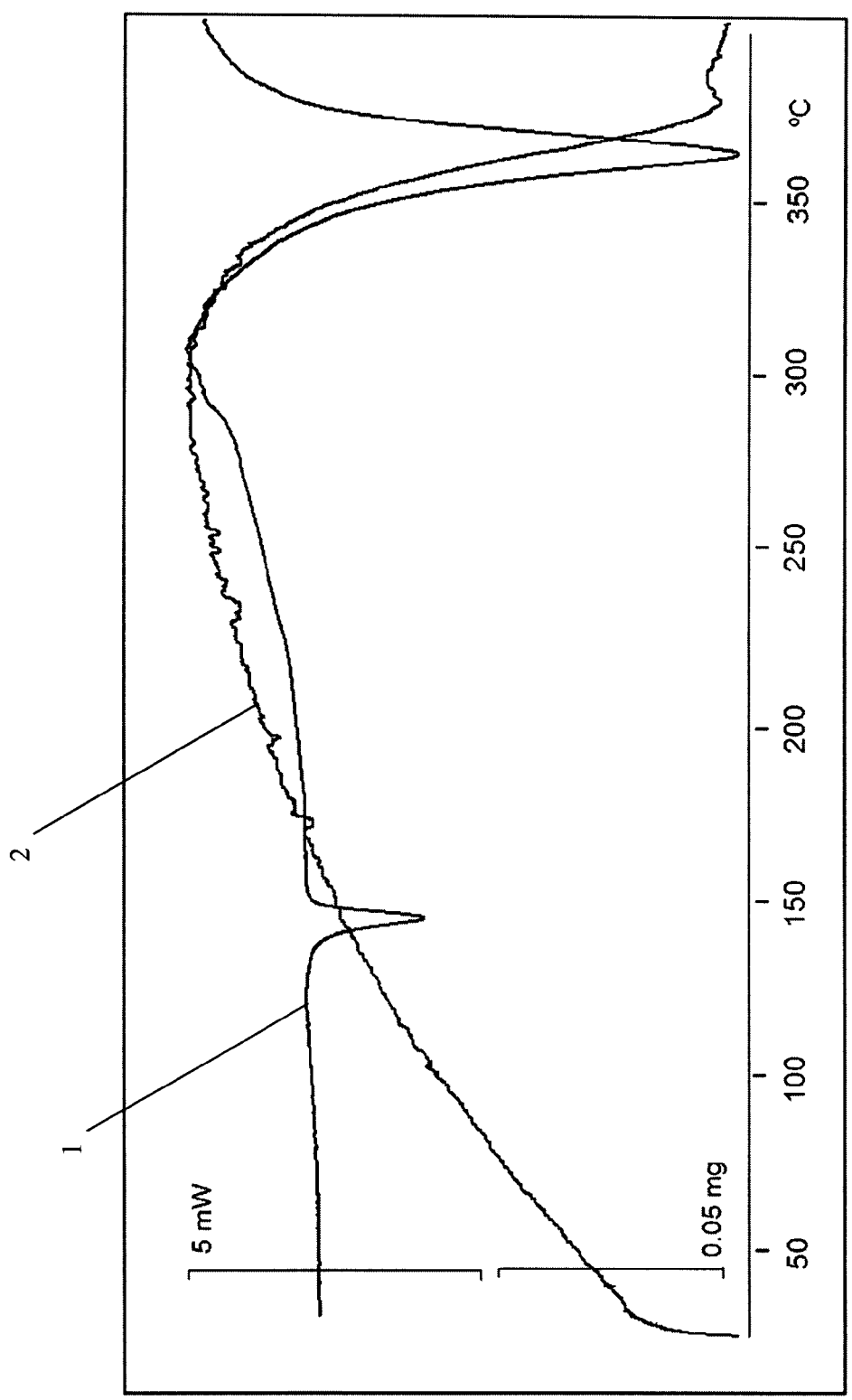
FIG. 3 shows both a differential scanning calorimeter (DSC) curve (black) and thermogravimetric analysis (TGA)

The sample of prepared calcium borohydride was analyzed by thermogravimetric analysis (TGA) and differential scanning calorimetry (DSC). FIG. 3 shows both a DSC curve (1) and a TGA curve (2) for a composition similar to the X-ray diffraction-pattern in FIG. 1. More particularly, the DSC curve in FIG. 3 shows two endothermic phase transitions at 140° C. and 350° C. while the TGA curve shows a weight loss at 350° C. presumed to be most likely related to hydrogen release from calcium borohydride since calcium hydride decomposes at higher temperatures. In order to verify this assumption we collected X-ray diffraction data at two points in the curve: at 150° C. and at 400° C. It was found that at 150° C., the X-ray diffraction pattern is similar to the starting sample. However, at 400° C. the X-ray diffraction pattern corresponds to $CaB_6$ and $CaH_2$ without $Ca(BH_4)_2$ present. Thus, upon release of hydrogen, calcium borohydride has completely decomposed to form $CaB_6$ and $CaH_2$, i.e., the reverse of above formula (I) which we know now is the starting mixture to synthesize calcium borohydride at 70 MPa and 440° C. Furthermore, above reaction formula in (b) is at least close to fully reversible at the described reaction conditions. Thus, this material can be used as a reversible hydrogen storage material for on-board storage if using a commercially available high-pressure tank (70 MPa).

Therefore, a new and novel method for the preparation of complex alkaline earth metal borohydride compounds has been demonstrated. To the extent necessary to understand or complete the disclosure of the present embodiment of the invention, all publications, patents, and patent applications mentioned herein are expressly incorporated by reference therein to the same extent as though each were individually so incorporated.

Having thus described exemplary embodiments of the present invention, it should be noted by those skilled in the art that the disclosures herein are exemplary only and that various other alternatives, adaptations, and modifications may be made within the scope of the present invention. Accordingly, the present invention is not limited to the specific embodiments as illustrated herein, but is only limited by the following claims.

We claim:

1. A method of producing a complex borohydride compound capable of reversible hydrogenation, comprising:
   mechanically mixing an alkaline earth metal hydride with an alkaline earth metal boride powder and a powder of metal chloride catalyst compound in order to provide a compound mixture, wherein the metal chloride catalyst comprises about 4 to about 8 weight percent of the combined weight of the alkaline earth metal hydride and the alkaline earth metal boride; and
   hydrogenating the compounded mixture at an elevated temperature and pressure to provide an alkaline earth metal borohydride compound.

2. The method according to claim 1, further comprising the step of compacting the compounded powder mixture prior to the step of hydrogenating the compounded powder mixture.

3. The method according to claim 2, wherein the molar ratio of the alkaline earth metal hydride and an alkaline earth metal boride is at least 2:1.

4. The method according to claim 3, wherein the alkaline earth metal hydride is selected from the group of hydrides consisting essentially of $CaH_2$.

5. The method according to claim 3, wherein the alkaline earth metal boride is selected from the group of borides consisting essentially of $CaB_6$.

6. The method according to claim 3, wherein said metal chloride catalyst compound is selected from the group of compounds consisting essentially of $TiCl_3$, a mixture of palladium and $TiCl_3$, and $RuCl_3$.

7. The method according to claim 1, wherein said step of mechanically mixing comprises a process selected from the group consisting of ball milling, plate or impact grinding, and blending, stirring, or agitating with or without a mechanical aid.

8. The method according to claim 7, wherein said step of mechanically mixing comprises ball milling the alkaline earth metal hydride, the alkaline earth metal boride, and the metal chloride catalyst for about 30 minutes.

9. The method according to claim 8, wherein said step of mechanically mixing is carried out in an atmosphere consisting essentially of high purity argon gas.

10. The method according to claim 8, wherein said step of mechanically mixing is carried out at about room temperature.

11. The method according to claim 1, wherein said step of hydrogenation is performed at a temperature of above about 400° C., and wherein said hydrogen pressure is maintained at about a pressure of 70 MPa.

12. The method according to claim 1, wherein the hydrogen pressure is maintained for at least about 2 hours.

* * * * *